Patented Apr. 9, 1935

1,997,489

UNITED STATES PATENT OFFICE 1,997,489

PLASTIC MASSES CONTAINING ALCOHOL SOLUBLE POLYMERIZED VINYL COMPOUNDS AND PROCESS OF PREPARING SAME

Willy O. Herrmann and Wolfram Haehnel, Munich, Germany, assignors, by mesne assignments, to Chemische Forschungsgesellschaft, m. b. H., Munich, Germany, a corporation of Germany No Drawing. Application August 23, 1932, Serial No. 630,061. In Germany March 15, 1930

4 Claims. (Cl. 106—22)

Organic polymerized vinyl compounds soften at relatively low temperatures. Therefore up to this time those compounds were not suitable for the manufacture of lacquers or moulded articles. Lacquers manufactured from polymerized vinyl compounds retain the solvent for a long time thus causing slow drying or sticking.

By addition of pigments this disadvantage is somewhat diminished, drying is promoted, while the stickiness is reduced. But the elasticity and tensile strength of the lacquer film are diminished. In a similar way also the properties of moulded articles are influenced.

Now we have found that the tensile strength of plastic masses containing polymerized vinyl compounds is considerably enlarged by adding a suitable quantity of cellulose or of substances of analogous micellar structure. Such "substances of micellar structure" are for instance natural and artificial wool, natural and artificial silk, wood pulp, polymerized vinyl alcohol and the like or especially paper pulp and paper. Small percents of cellulose or paper will make a polymerized vinyl acetate film hard and not sticking. The amount of the addition depends on the purpose the masses are used for. Generally for lacquers and springled casting masses a smaller quantity will be sufficient than for moulded articles. As "polymerized vinyl compounds" are understood esters and acetals of polymerized vinyl alcohol, esters of polymerized acrylic acid, polymerized styrene and derivatives and combinations containing such polymerized vinyl compounds, also such as e. g., described in U. S. Appl. Ser. N. 501,922.

The plastic masses containing polymerized vinyl compounds and fibres or substances of an analogous micellar structure can be used immediately or they may be combined as parent substances with additional substances as softeners, pigments, colours, resins, cellulose esters, oils, fibrous or nonfibrous fillers and the like. Such additional substances can be mixed with the polymerized vinyl compounds prior to or subsequent to the incorporation of the fibres. For the manufacture of moulded articles and victrola records there may be added known ingredients such as natural and artificial resins, filling and colouring materials such as slate dust, heavy spar, colcothar, magnesia, asbestos, carbon black, stearine and so on.

The masses with or without the addition of other ingredients or suitable substances can be used for the manufacture of lacquers, of moulded and springled casting masses, of victrola records and the like in any known manner. For instance for manufacturing victrola records they can be pressed out directly in suitable apparatus in softened or powdered form with or without a support or intermediate layer of another material such as paper, wood or metal or the like. In this case e. g. the intermediate layer such as paper or sheets of paper stuck together is covered in any manner with the softened, powdered of emulsified mass and then pressed out. For manufacturing lacquers any other suitable solvent or ingredient may be added and also, if necessary or desired pigments or colours and the like. The manufacturing is performed by means of kneading machines, colour mills or the like, known in the skilled art.

The manufacture of the masses can be modified according to different purposes. For instance a solution of the polymerized vinyl compound can be thoroughly mixed with paper pulp, the mixture may be milled, for instance in a colour mill and can be directly used as parent substance for lacquers. Otherwise a perfect mixture of a solution of polymerized vinyl compound and paper pulp can be precipitated by water as a paste or cake, which may be used wet or dried as a parent substance for moulded articles of any kind. One may proceed from a definite modification of a polymerized vinyl compound but of course various modifications or kinds of polymerized vinyl compound can be used in suitable combinations.

The following examples illustrate the invention, but we wish to say that the invention is not limited to them. The parts given are by weight.

Example I 150 parts of a 50% solution of polymerized vinyl acetate in spirit are thoroughly milled with 2 parts of paper pulp and 10 parts of zinc white. The lacquer thus obtained dries quickly and gives a well adhering film. This film is harder than a film obtained from the same lacquer without paper pulp. The mass obtained dried by evaporating the solvent may be also used as ingredient for the manufacture of moulded articles, victrola records and the like.

Example II 700 parts of polymerized vinyl acetate are dissolved in spirit to a 25% solution and mixed with 50 parts of the dimethyl ester of phthalic acid. 250 parts of paper are thoroughly kneaded with this solution. The mass may be used with or without other suitable ingredients for varnish purposes e. g. as a primer coat or for the manufacture of moulded articles or victrola records. The ingredients necessary for the purpose desired can be added during or after the kneading process. The mass may also be dried by evaporation of the solvent, milled and directly or after mixing with other suitable substances such as resins, shellac, filling materials, colours and so on may be used for moulded articles for the electrical industry, victrola records and the like.

Example III 600 parts of polymerized vinyl acetate are dissolved in spirit to a 25% solution. 30 parts of the dimethyl ester of phthalic acid are added and 300 parts of short wool are thoroughly kneaded with this solution. The mass may be used and worked up according to Example II.

Example IV

In a kneading apparatus 850 parts of a highly polymerized vinyl acetate dissolved in 1500 parts of spirit are mixed with 700 parts of paper. There are added 600 parts of aldehyde resin according to U. S. Patent 1,643,496, 500 parts of slate dust and 30 parts of carbon black. After being perfectly mixed the mass is dried by evaporation of the solvent if necessary milled and used for the manufacture of moulded articles, victrola records and the like.

Example V 450 parts of highly polymerized vinyl acetate dissolved in 900 parts of spirit are mixed with 200 parts of paper in a kneading apparatus. There are added 100 parts of nitrocellulose moistened with spirit and 200 parts of a combined resin of polymerized vinyl acetate and aldehyde resin according to U. S. Appl. Ser. 367,608, together with 24 parts of benzyl benzoate, 100 parts of magnesium oxide and 1 part of carbon black. This mass after having been dried and if necessary milled may be directly or after addition of other suitable substances used for the manufacture of moulded articles, victrola records and the like.

Example VI 500 parts of polymerized vinyl butyrate are dissolved in spirit to a 25% solution. 25 parts of the diethyl ester of phthalic acid are added and 300 parts of short acetate silk waste and 5 parts of carbon black are thoroughly kneaded with this solution. The mass may be used and worked up according to Example II.

Example VII 700 parts of polymerized vinyl chloroacetate and 200 parts of ground shellac are dissolved in spirit to a 25% solution. 50 parts of the dimethyl ester of phthalic acid are added and 300 parts of cellulose are thoroughly kneaded with this solution. The mass may be used and worked up according to Example II.

Example VIII 85 parts of polymerized vinyl alcohol formaldehyde acetal dissolved in methylene chloride are kneaded with 25 parts of paper. There are added 60 parts of an aldehyde resin according to U. S. Patent 1,643,496, 50 parts of heavy spar and 3 parts of carbon black. The mass is dried and if necessary milled and used as in Example II.

Example IX 100 parts of a compound of polymerized vinyl esters and fatty oils according to Example I of U. S. Appl. Ser. N. 501,922 dissolved in 100 parts of sangay oil are kneaded together with 30 parts of paper. There can be added desired substances according to the purpose for using. The mass may be dried and directly or after being mixed with desired suitable substances used for lacquer purposes or for the manufacture of moulded articles, for victrola records and the like.

Example X 100 parts of polymerized styrene are molten together with 100 parts of shellac and 50 parts of aldehyde resin such as described in U. S. Patent 1,643,496. With the molten mass are well mixed 75 parts of paper flocks. The mass obtained is used according to Example II.

Example XI 500 parts of a 20 percent solution of the methylester of polyacrylic acid in acetic ester is kneaded with 50 parts of paper. The product obtained is used as in Example II.

By homogenizing polymerized vinyl compounds with cellulose or analogous substances a surprising effect is obtained. The plastic qualities of the vinyl component are completed in a specific manner by the stiffening power of the cellulose ingredient. Thus a homogeneous new modification of high technical value is generated. The especial ability of these two groups of substances is apparently caused by their affinity. Polymerized vinyl alcohol shows an affinity to carbohydrates such as cellulose and a peculiar inclination to form fibres like cellulose (Ber. 1927, 2659). The polymerized vinyl compounds have similar qualities as those of cellulose. Most probably the particles of polymerized vinyl alcohol are orientated in the direction of the length of the fibre like those of cellulose (Ber. 1920, 2162–2164). Polymerized vinyl alcohol is analogous to wool, silk and the like by its micellar structure.

Our invention is based on the fact, that the micellar structure of stretched fibrous products causes an especially intimate combination of polymerized vinyl esters and these singular fillers.

While we have especially described the preferred embodiment of our invention, it is to be understood that the invention is not to be limited to all of the details hereinbefore described, but may be otherwise varied within the scope of the following claims.

We claim as our invention:

1. Process of producing plastic masses suitable for molding purposes and for lacquers comprising thoroughly mixing polymerized vinyl alcohol fibers with at least 55% of an alcohol soluble polymerized vinyl acetate dissolved in alcohol.

2. A product suitable for molding purposes and for lacquers containing polymerized vinyl alcohol fibers thoroughly incorporated with at least 55% of an alcohol soluble polymerized vinyl acetate dissolved in alcohol.

3. A record having sound grooves, said record containing fibers of polymerized vinyl alcohol thoroughly incorporated with a polymerized vinyl acetate.

4. A composition containing polymerized vinyl alcohol fibers thoroughly incorporated with a polymerized vinyl acetate.

WILLY O. HERRMANN.
WOLFRAM HAEHNEL.